United States Patent [19]

Debras et al.

[11] Patent Number: 5,639,834

[45] Date of Patent: Jun. 17, 1997

[54] PROCESS FOR PRODUCING POLYETHYLENE HAVING A BROAD MOLECULAR WEIGHT DISTRIBUTION

[75] Inventors: Guy Debras, Bon-Villers; Hugo Vandaele, Antwerp, both of Belgium

[73] Assignee: Fina Research, S.A., Feluy, Belgium

[21] Appl. No.: 329,400

[22] Filed: Oct. 26, 1994

[30] Foreign Application Priority Data

Oct. 26, 1993 [BE] Belgium ................................ 09301144

[51] Int. Cl.⁶ ........................... C08F 2/06; C08F 10/14
[52] U.S. Cl. ........................ 526/64; 526/65; 526/348.5; 526/352
[58] Field of Search ..................... 526/64, 65, 352, 526/348.5

[56] References Cited

U.S. PATENT DOCUMENTS 4,613,484  9/1986  Ayres et al. ........................... 422/132

FOREIGN PATENT DOCUMENTS 057420  8/1982  European Pat. Off. .

Primary Examiner—Thomas R. Weber
Attorney, Agent, or Firm—William D. Jackson; Jim D. Wheelington; M. Norwood Cheairs

[57] ABSTRACT

In a process for the copolymerization of ethylene in two liquid full loop reactors in series wherein the average molecular weight is regulated, the introduction of the comonomer is made in the first reactor, and high and low average molecular weight polymers are produced respectively in the first and second reactor, the improvement which consists in using one or more settling legs of the first reactor for the transfer.

10 Claims, No Drawings

PROCESS FOR PRODUCING POLYETHYLENE HAVING A BROAD MOLECULAR WEIGHT DISTRIBUTION

TECHNICAL FIELD OF THE INVENTION

The present invention concerns a process for producing polyethylene having a broad molecular weight distribution. More particularly, the present invention relates to the production of high density polyethylene copolymers having a broad or bimodal molecular weight distribution.

BACKGROUND OF THE INVENTION

For high density polyethylene, hereinafter referred to as polyethylene, the molecular weight distribution (MWD) is one of the basic properties that determines the properties of the polymer, and thus its end-uses.

Although it may be difficult to evaluate the influence of each property taken independently, it is generally accepted that the molecular weight mostly determines the mechanical properties while the molecular weight dispersion mostly determines the rheological properties.

There is a demand for high molecular weight polyethylene, because an increase of the molecular weight normally improves the physical properties of the resins. However, high molecular weights tend to make polymers harder to process. On the other hand, an increase in the MWD tends to improve the flowability at high shear rate during the processing. Thus, broadening the MWD is one way to improve the processing of high molecular weight (=low melt flow index) polyethylene, in applications requiring fast processing at fairly high die swell, such as in blowing and extrusion techniques.

Some believe that, in polyethylene having a high molecular weight combined with a broad MWD, the lower molecular weight portion aids in processing while the higher molecular weight portion contributes to the good impact resistance of the film, such polyethylene being processed at higher throughput rates with lower energy requirements.

The MWD may be described completely by the curve obtained by gel permeation chromatography. However, the MWD is generally described by a figure which is a good evaluation, also called the polydispersity index, representing the ratio of the weight average to the number average molecular weight.

Depending on the applications, the required MWD will range from 10 to 30.

It was first proposed to prepare polyethylene having broad MWD by blending polyethylenes having different molecular weights in order to obtain the advantages of a broad distribution. However, the results were not satisfactory as a blend does not behave like an intimate mixture of polyethylenes prepared in situ.

It has also been proposed to use two-step reactions in one reactor. Examples of such processes are described in GB-1174542-A, GB-2020672-A and BE-883687-A.

It has further been proposed to use several reactors connected in series.

For this purpose a process is known for the preparation of polymodal ethylene polymer in which ethylene is polymerized in two stages in the presence of a halogen-containing organoaluminum compound, a transition metal compound and different amounts of hydrogen in each stage (GB 1233599).

A process is furthermore known for the preparation of olefin polymers by a two-stage polymerization, a high molecular polymer being prepared in the first stage at a low $H_2/C_2H_4$ ratio and a low-molecular polymer being prepared in the second stage at high $H_2/C_2H_4$ ratio (EP-A 57,352). The catalyst used is, inter alia, a halogen-containing organoaluminum compound together with the reaction product of an oxygen-containing organomagnesium compound and an oxygen-containing organotitanium compound, both of which are in solution, and an aluminum halide. A similar process is disclosed in EP-57420-A.

It has also been proposed a process to polymerize ethylene in two stages according to which the pressure in the second reactor is kept lower than in the first one; the polymerization is carried out in the presence of usual Ziegler-Natta catalyst such as a transition metal catalyst supported on a solid carrier and an organoaluminum compound. Examples of such processes are described in U.S. Pat. Nos. 4,414,369 and 4,338,424.

However, the ethylene polymers obtained with such processes are not very convenient as regard to their mechanical properties. It has now been found that the prior art processes involving two liquid-full loop reactors connected in series could be improved.

It is therefore an object of the present invention to provide an improvement to such processes for the copolymerization of ethylene to form ethylene copolymers with good processability, good physical properties and diverse applicability.

It has been found that this object can be achieved with a two-stage process involving liquid full loop reactors connected in series, the improvement consisting of using one or more settling legs of the first reactor for the transfer.

DESCRIPTION OF THE INVENTION

It has now been found that polyalkenes with a wide molecular weight distribution and a very good homogeneity can be obtained by the process of polymerizing ethylene, with at most 20 mole % of one or more other alpha-alkenes of 3 to 10 carbon atoms, in two liquid full loop reactors connected in series at a temperature of 50° to 120° C., preferably 60° to 110° C., under an absolute pressure of 1 to 100 bar in the presence of a catalyst, the average molecular weight being regulated, which process comprises carrying out the polymerization such that the introduction of a co-monomer is carried out essentially in the first reactor, that the molecular weight is regulated in the first reactor to form polymers having a high load melt index (HLMI; ASTM-D1238, 190° C./21.6 kg) between 0.01 and 10 g/10 min and that the residence time in the first reactor is adjusted to produce 30 to 70 wt % of the total polymer, while the molecular weight is regulated in the second reactor to form polymers such that the final polymers have HLMIs higher than 10 g/10 min, the improvement consisting in using one or more settling legs of the first reactor for the transfer.

Ethylene is injected with the comonomer in the first loop reactor together with the catalyst system (i.e. the catalyst precontacted with the cocatalyst).

The slurry polymerization of ethylene is carried out in two liquid full loop reactors connected in series. Loop reactors are known in the art and need not be described here; reference is made e.g. to U.S. Pat. Nos. 3,152,872, 3,242,150 and 4,613,484.

As already indicated, the alpha-olefin comonomer should essentially be introduced and copolymerized in the first reactor. As comonomer which may be used in the present process, alpha-olefins having from 3 to 10 carbon atoms are used, preferably 1-hexene.

The polymerization is carried out at a temperature of from 50° to 120° C., preferably from 60° to 110° C., and at a pressure of 1 to 100 bar, preferably from 30 to 50 bar.

Molecular weight regulation is known in the art and need not be described further. When using Ziegler-Natta type catalysts, hydrogen is preferably used, a higher hydrogen pressure resulting in a lower average molecular weight; thus hydrogen is maintained at a low concentration, e.g. comprised between 0–0.1 vol % in the first reactor and at a very high concentration, e.g. between 0.5–2.4 vol %, in the second reactor. When chromium-type catalysts are used, polymerization temperature is preferably used to regulate molecular weight. After the first reactor, the HLMI should preferably be between 0.01 and 5 g/10 min, most preferably between 0.1 and 2 g/10 min. The HLMI of the final polymers is in any case higher than that of the polymers obtained after the first reactor, preferably higher than 5 g/10 min.

The ethylene polymer stream obtained in the first reactor is transferred to the second loop reactor through one or more settling legs of the first reactor, e.g. using two settling legs (each one being independently filled with reactor slurry, solids being concentrated by gravity settling, and discharged). Loop reactors are usually operated at 25–45 wt % of solids, and it is preferable to transfer the contents of a settling leg when it is filled with solids at a concentration that is at least 5 wt % higher than the solids concentration in the reactor, more preferably at least 10% higher, most preferably at least 20% higher. The slurry transferred to the second reactor usually contains 40–65 wt % of solids; an additional separation of solids and liquid would not alter the process of the invention.

It has surprisingly been found that the use of settling legs for the transfer results in polymers having improved properties; this was indeed very surprising over the prior art which envisages either one reactor successively operated under different conditions or two liquid full reactors between which the slurry is transferred.

Under the polymerization conditions, it has been found that the high molecular weight part of the polymer (HMW) is formed in the first reactor. Generally, this part represents from 10 to 90 wt % and preferably from 30 to 70 wt % of the bimodal polymer.

According to the process of the invention, the transfer between the reactors is carried out using one or more settling legs of the first reactor. Settling legs of loop reactors are known in the art and need not be described here; reference is made e.g. to U.S. Pat. Nos. 3,152,872, 3,242,150 and 4,613,484.

According to a preferred embodiment of this invention, there is used a catalyst C consisting of a transition metal component (component A) which is the reaction product of an organomagnesium compound with a titanium compound, an organoaluminum compound (compound B), and optionally one or more electron donors.

As transition metal compounds suitable for the preparation of component A, there may be used tetravalent halogenated titanium compounds, preferably titanium compounds of the general formula $TiX_n(OR)_{4-n}$ in which n is 1 to 4, X stands for chlorine or bromine, and R for identical or different hydrocarbon radicals, especially straight-chain or branched alkyl groups having 1 to 18, preferably 1 to 10, carbon atoms. Examples thereof are:

$TiCl_4, Ti(OC_2H_5)_2Cl_2, Ti(OC_2H_5)_3Cl, Ti(OC_3H_7)_2Cl_2, Ti(OC_3H_7)_3Cl,$

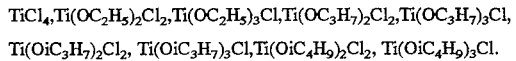

In some cases, it may be advantageous to prepare the halogeno-ortho-titanic acid esters of the above formula in situ by reacting the respective ortho-titanic acid ester with $TiCl_4$ in a corresponding proportion.

This reaction is advantageously carried out at temperatures of from 0° to 200° C., the upper temperature limit being determined by the decomposition temperature of the tetravalent halogenated titanium compound used; it is advantageously carried out at temperatures of rom 60° to 120° C.

The reaction may be effected in inert diluents, for example aliphatic or cycloaliphatic hydrocarbons as are currently used for the low pressure process such as propane, butane, pentane, hexane, heptane, cyclohexane, methyl-cyclohexane as well as aromatic hydrocarbons, such as benzene or toluene; hydrogenated Diesel oil fractions which have been carefully freed from oxygen, sulfur compounds and moisture are also useful.

Subsequently, the reaction product of magnesium alcoholate and tetravalent halogenated titanium compound which is insoluble in hydrocarbons is freed from unreacted titanium compound by washing it several times with one of the above inert diluents in which the titanium-(IV)-compound used is readily soluble.

For preparing component A, magnesium alcoholates, preferably those of the general formula $Mg(OR')_2$ may be used, in which R' stands for identical or different hydrocarbon radicals, preferably straight-chain or branched alkyl groups having 1 to 10 carbon atoms; magnesium alcoholates having alkyl groups of from 1 to 4 carbon atoms are preferred. Examples thereof are $Mg(OCH_3)_2$, $Mg(OC_2H_5)_2$, $Mg(OC_3H_7)_2$, $Mg(OiC_3H_7)_2$, $Mg(OC_4H_9)_2$, $Mg(OiC_4H_9)_2$, $Mg(OCH_2-CH_2-C_6H_5)_2$.

The magnesium alcoholates can be prepared by known methods, for example by reacting magnesium with alcohols, especially monohydric aliphatic alcohols.

Magnesium alcoholates of the general formula X—Mg—OR' in which X stands for halogen, $(SO_4)_{1/2}$, carboxylate, especially acetate, or OH, and R' has the above meaning, may also be used.

These compounds are, for example, obtained by reacting alcoholic solutions of the corresponding anhydrous acids with magnesium.

The titanium content of component A may be within the range of from 1.5 to 20 wt %. It can be controlled by the reaction time, the reaction temperature and the concentration of the tetravalent halogenated titanium compound used.

The concentration of the titanium component fixed on the magnesium compound is advantageously in the range of from 0.005 to 1.5 mmol, preferably from 0.03 to 0.8 mmol, per liter of dispersing agent or reactor volume. Generally, even higher concentrations are possible.

The organo-aluminum compounds used may be reaction products of aluminum-trialkyl or aluminum-dialkyl hydrides with alkyl radicals having 1 to 16 carbon atoms, preferably $Al(iBu)_3$ (Bu=butyl) or $Al(iBu)_2H$, and diolefins containing 4 to 20 carbon atoms, preferably isoprene, for example aluminum isoprenyl.

Furthermore, suitable as component B are chlorinated organo-aluminum compounds, for example dialkyl-aluminum monochlorides of the formula $R''_2AlCl$ or alkyl-aluminum sesquichlorides of the formula $R''_3Al_2Cl_3$, in which formulae R'' stands for identical or different hydrocarbon radicals, preferably alkyl groups having 1 to 16 carbon atoms, preferably 2 to 12 carbon atoms, for example $(C_2H_5)_2AlCl$, $(iC_4H_9)_2AlCl$, $(C_2H_5)_3Al_2Cl_3$.

It is advantageous to use, as component B, aluminum-trialkyls of the formula $AlR'''_3$ or aluminum-dialkyl hydrides of the formula $AlR'''_2H$, in which formulae R''' stands for identical or different hydrocarbons, preferably alkyl groups having 1 to 16, preferably 2 to 6, carbon atoms, for example $Al(C_2H_5)_3$, $Al(C_2H_5)_2H$, $Al(C_3H_7)_3$, $Al(C_3H_7)_2H$, $Al(iC_4H_9)_3$, or $Al(iC_4H_9)_2H$.

Component B may be used in a concentration of from 0.1 to 10 mmol per liter of reactor volume, preferably 0.5 to 5 mmol.

Catalyst C may optionally comprise one or more usual electron-donors, in addition, which electron-donors may be of the internal and/or external types. Electron donors are known in the art; usual electron donors are ester compounds, such as an isoalkylphthalate, diether compounds and silane compounds.

According to other embodiments of this invention, other types of catalyst systems may be used, such as metallocene catalysts (usually with an aluminoxane cocatalyst) or chromium-type catalysts. Those types of catalysts are well known in the art and need not be described here.

The following examples are given to illustrate the process of the invention without limiting its scope.

EXAMPLE 1

The copolymerization of ethylene with 1-hexene was carried out in two liquid full loop reactors connected in series, in accordance with the polymerization process described hereabove, under the conditions specified in table 1.

Transfer between the reactors was made through a settling leg of the first reactor, each time the leg was filled with slurry in which polymer represented about 60 wt %. The catalyst was prepared according to Example 1 of U.S. Pat. No. 4,816,433. Tri-isobutyl aluminium was used as cocatalyst. Isobutane ($iC_4$; 35 kg/h) was used as diluant.

Physical and mechanical properties for the final product are also summarized in Table 1.

Comparative Example A

The copolymerization of ethylene with 1-hexene was carried out in two liquid full loop reactors using the same catalytic system and under the same reaction conditions as in example 1, except as indicated in table 1 and except that slurry from the first reactor was continuously transferred to the second reactor using a transfer line. The properties of the resin obtained are also described in the same table.

By using the process of the invention, one observes that 1-hexene is preferentially polymerized in the high molecular weight fraction, and this is known to impart better properties on the polymer (Narumi Ishikawa et al., Proc. 10th Plastic Fuel Gas Pipe Symposium, Oct. 27–29, 1987, pages 175–183).

TABLE I

|  | Example With Settling Legs | Comparative Without Settling Legs |
|---|---|---|
| REACTOR 1 |  |  |
| Reactor vol (l) | 70 | 70 |
| T (°C.) | 75 | 75 |
| $C_2$- (kg/h) | 4.0 | 4.95 |
| $C_2$- (wt %) | 0.51 | 0.74 |
| $C_6$- (kg/h) | 0.67 | 0.55 |
| $C_6$- (wt %) | 1.41 | 0.98 |
| $H_2$ (vol %) | 0.017 | 0.015 |
| PE resid. time (min) | 68 | 81 |

TABLE I-continued

|  | Example With Settling Legs | Comparative Without Settling Legs |
|---|---|---|
| TiBAL (ppm) | 350 | 200 |
| HLMI (g/10') | 0.67 | 0.82 |
| Density (g/cc) | 0.926 | 0.9204 |
| HMW part (wt %) | 58 | 54 |
| REACTOR 2 |  |  |
| Reactor vol (l) | 35 | 70 |
| T (°C.) | 95 | 95 |
| $C_2$- (kg/h) | 4.0 | 5.1 |
| $C_2$- (wt %) | 4.0 | 2.2 |
| $C_6$- (kg/h) | 0 | 0 |
| $C_6$- (wt %) | 0.7 | 0.51 |
| $H_2$ (vol %) | 1.84 | 0.86 |
| PE resid. time (min) | 29 | 55 |
| HLMI (g/10') | 11.4 | 12.9 |
| Density (g/cc) | 0.941 | 0.9414 |
| Productivity (g/g cat) | 11150 | 22450 |
| $C_6$- conversion (wt %) |  |  |
| Total | 61.5 | 88.2 |
| In Reactor 1 | 57.4 | 93.7 |

We claim:

1. In a process for polymerizing ethylene with at most 20 mole % of one or more alpha-alkenes of 3 to 10 carbon atoms, in two liquid full loop reactors comprising a first and second reactor connected in a series by one or more settling legs of the first reactor connected for discharge of slurry from the first reactor to the second reactor, said process being carried out at a temperature of 50° to 120° C. under an absolute pressure of 1 to 100 bar in the presence of a catalyst, the average molecular weight being regulated, which process comprises carrying out the polymerization such that the introduction of a co-monomer is carried out essentially in the first reactor, that the molecular weight is regulated in the first reactor to form polymers having HLMI between 0.01 and 10 g/10 min., that the residence time in the first reactor is adjusted to produce 30 to 70 wt % of the total polymer and that the molecular weight is regulated in the second reactor to form polymers such that the final polymers have a HLMI higher than 1 g/10 min., the improvement which comprises using one or more settling legs of the first reactor for the transfer to the second reactor wherein the solids content of the slurry in said settling leg is concentrated by gravity settling to a solids concentration that is at least 5 wt % higher than the solids concentration in the first reactor and then discharged from said settling leg to the second reactor.

2. The process of claim 1, wherein the contents of the settling leg is transferred whenever it has a solids concentration at least 10 wt % higher than that in the first reactor.

3. The process of claim 2, wherein the contents of the settling leg is transferred whenever it has a solids concentration at least 20 wt % higher than that in the first reactor.

4. The process according to any one of claims 1, 2 or 3, wherein the catalyst consists of a transition metal component which is the reaction product of an organomagnesium compound with a titanium compound, an organoaluminium compound and optionally one or more electron donors, the average molecular weight being regulated with hydrogen.

5. The process according to claim 4, wherein the polymerization temperature is of 60° to 110° C.

6. The process according to claim 4, wherein the polymerization pressure is of 30 to 50 bar.

7. The process according to any one of claims 1, 2, 3, 5 and 6, wherein the polymers formed in the first reactor have a HLMI between 0.01 and 5 g/10 min., preferably between 0.1 and 2 g/10 min.

8. The process according to any one of claims 1, 2, 3 and 5–7, wherein the final polymers have a HLMI higher than 5 g/10 min.

9. The process according to claim 4, wherein the polymers formed in the first reactor have a HLMI between 0.1 and 2 g/10 min.

10. The process of claim 4, wherein the transfer of the slurry from the first reactor to the second reactor is carried out employing at least two settling legs, each of which is independently filled with slurry from the first reactor and then concentrated by gravity settling and discharged to the second reactor.

* * * * *